(12) United States Patent
Searby

(10) Patent No.: US 8,243,460 B2
(45) Date of Patent: Aug. 14, 2012

(54) EXPANSION CARD GUIDE

(75) Inventor: Tom J. Searby, Eaton, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 581 days.

(21) Appl. No.: 12/549,894

(22) Filed: Aug. 28, 2009

(65) Prior Publication Data

US 2011/0050057 A1    Mar. 3, 2011

(51) Int. Cl.
*H05K 5/00* (2006.01)
(52) U.S. Cl. .......................... 361/756; 361/807; 361/810
(58) Field of Classification Search .................. 361/727, 361/756, 759, 741, 686, 802, 807, 810; 439/377, 439/374; 235/483
See application file for complete search history.

(56) References Cited

U.S. PATENT DOCUMENTS

| | | | |
|---|---|---|---|
| 6,322,042 B1 * | 11/2001 | Nemec ........................... | 248/694 |
| 6,330,156 B1 * | 12/2001 | Cresse .......................... | 361/695 |
| 6,542,362 B2 * | 4/2003 | Lajara et al. ............. | 361/679.48 |
| 6,674,641 B2 * | 1/2004 | Jensen et al. ............. | 361/679.48 |
| 6,722,971 B2 * | 4/2004 | Gough .......................... | 454/187 |
| 6,744,632 B2 * | 6/2004 | Wilson et al. ................. | 361/695 |
| 7,419,379 B2 * | 9/2008 | Wu et al. ......................... | 439/65 |

* cited by examiner

Primary Examiner — Hung S Bui

(57) ABSTRACT

In at least some embodiments, an expansion card guide for a computer system includes a frame having lanes for receiving expansion cards and a plurality of chassis attachment features provided on at least one side of said frame for tool-less attachment of the expansion card guide to a chassis of the computer system. The expansion card guide also includes a set of cable management features provided on at least one side of said frame for tool-less management of auxiliary expansion card cables.

20 Claims, 9 Drawing Sheets

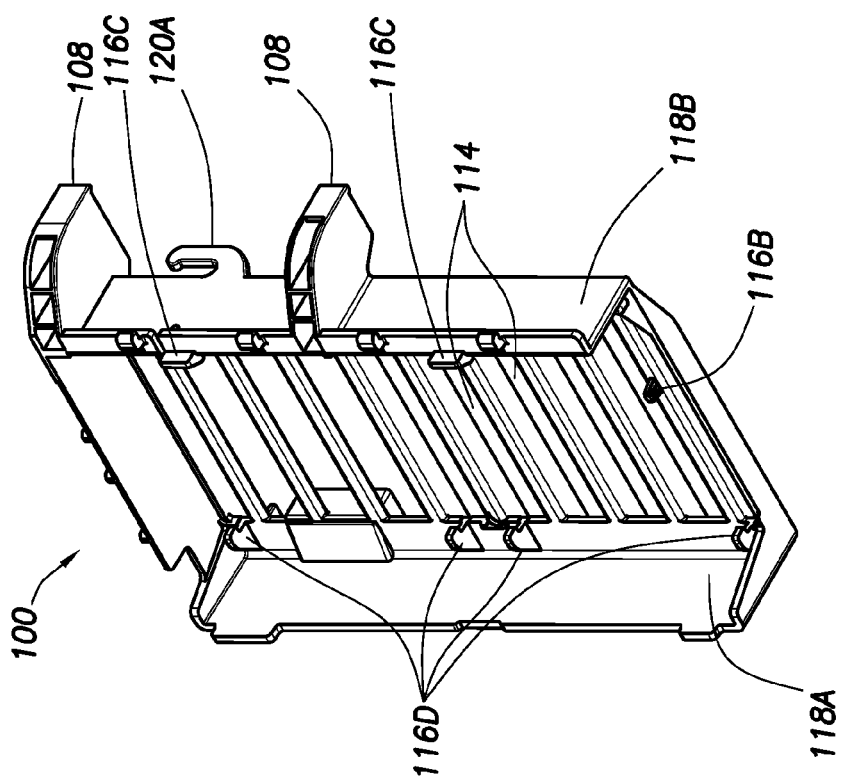
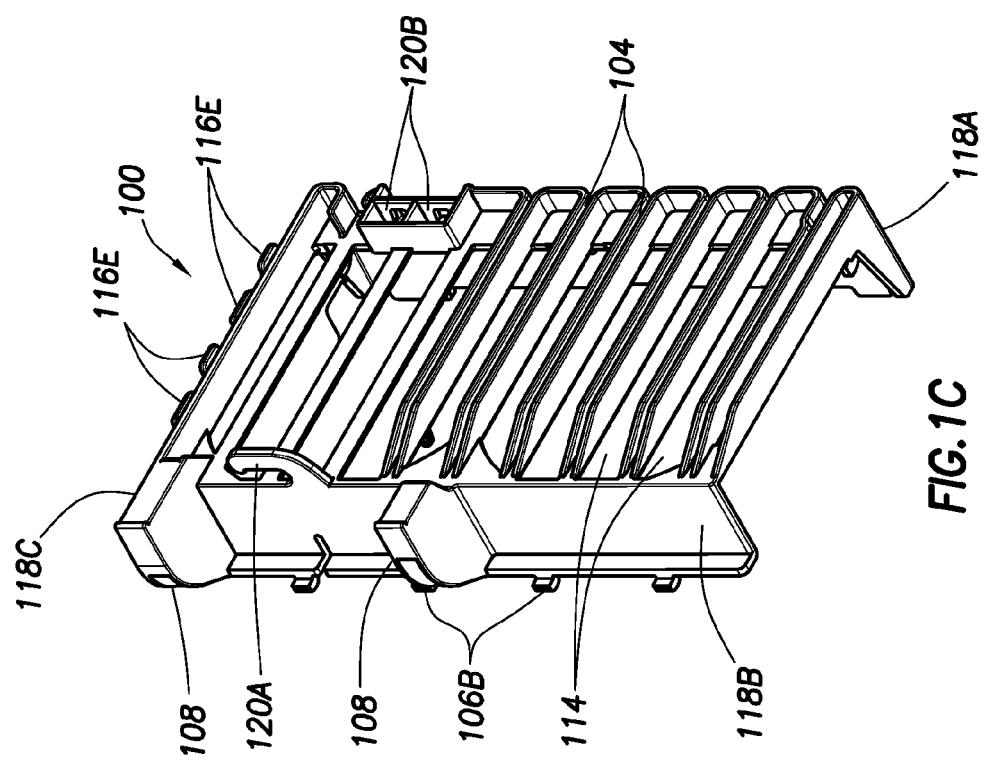

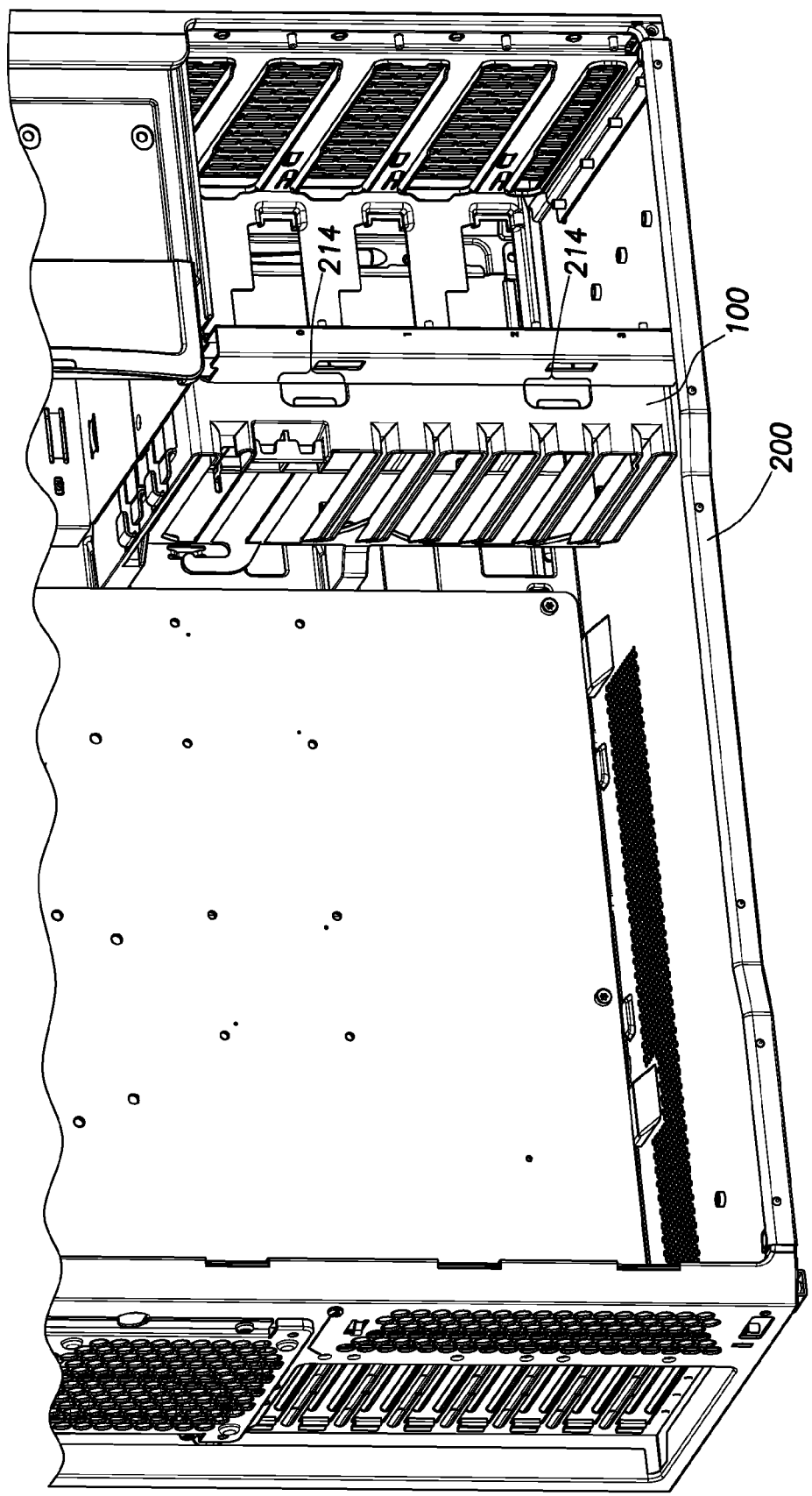

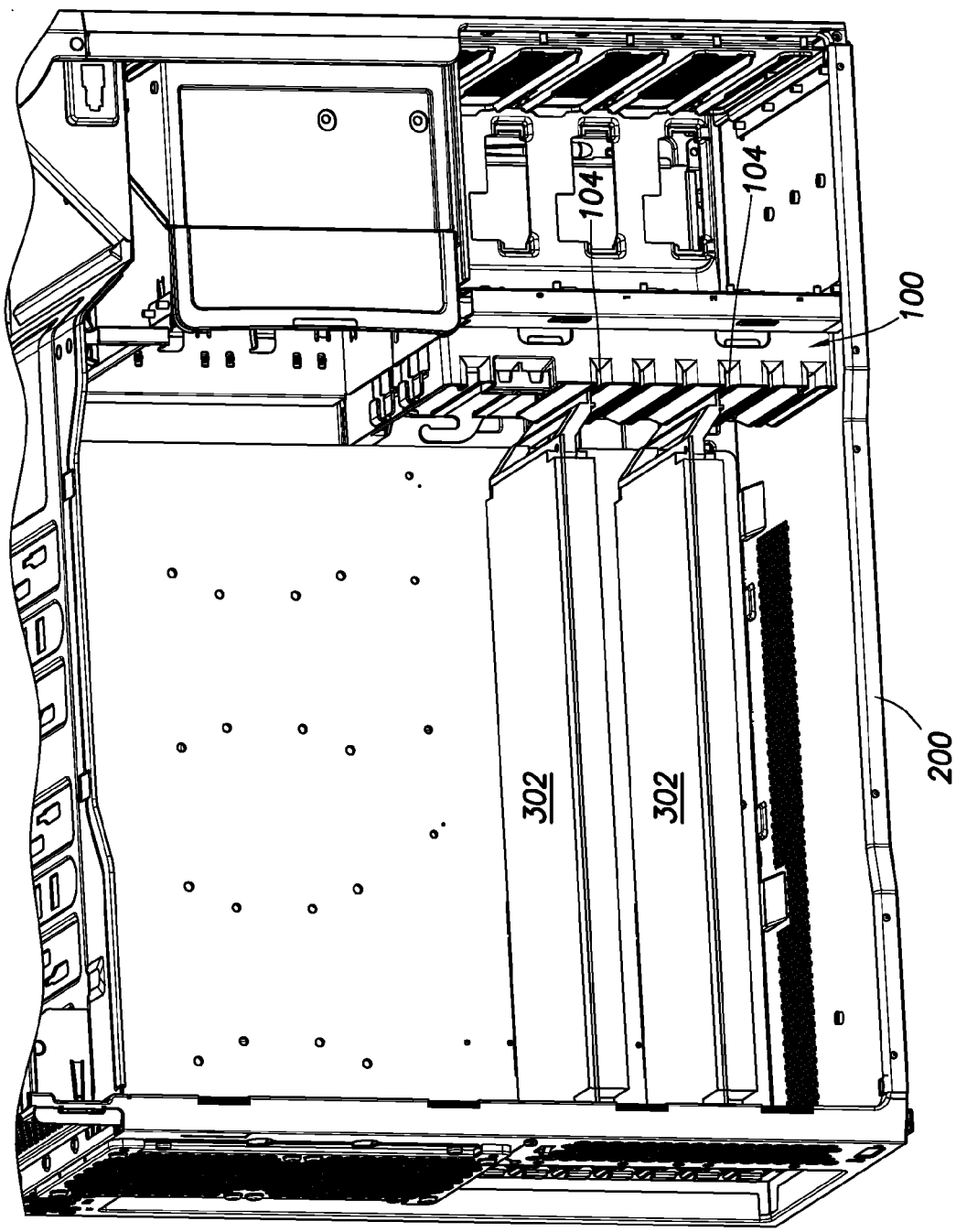

EXPANSION CARD GUIDE

BACKGROUND

Installment of expansion cards (e.g., video cards, sound cards, network cards, or other cards) into a computer system can sometimes be a difficult task. For example, the interior of a computer system is often filled with cables and other obstructions that impede installment. Once installation is complete, airflow issues and stability issues also may arise.

BRIEF DESCRIPTION OF THE DRAWINGS

For a detailed description of exemplary embodiments of the invention, reference will now be made to the accompanying drawings in which:

FIGS. 1A-1D show various perspective views of a multi-functional expansion card guide in accordance with an embodiment of the disclosure;

FIGS. 2A-2B show attachment of the multi-functional expansion card guide into a computer system chassis in accordance with an embodiment of the disclosure;

FIG. 3 shows installation of expansion cards into a computer system chassis having the multi-functional expansion card guide in accordance with an embodiment of the disclosure;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." In the following discussion and in the claims, the terms "tool-less" and "tool-lessly" are intended to mean without use of installation tools such as screwdrivers. The terms "tool-less" and "tool-lessly" do not preclude manual (hand) installation nor fasteners that are manually installed.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the invention are directed to a multi-function expansion card guide and methods for its use. In at least some embodiments, the multi-function expansion card guide comprises a single piece of molded plastic having various attachment features and cable management features.

Figure 1B:
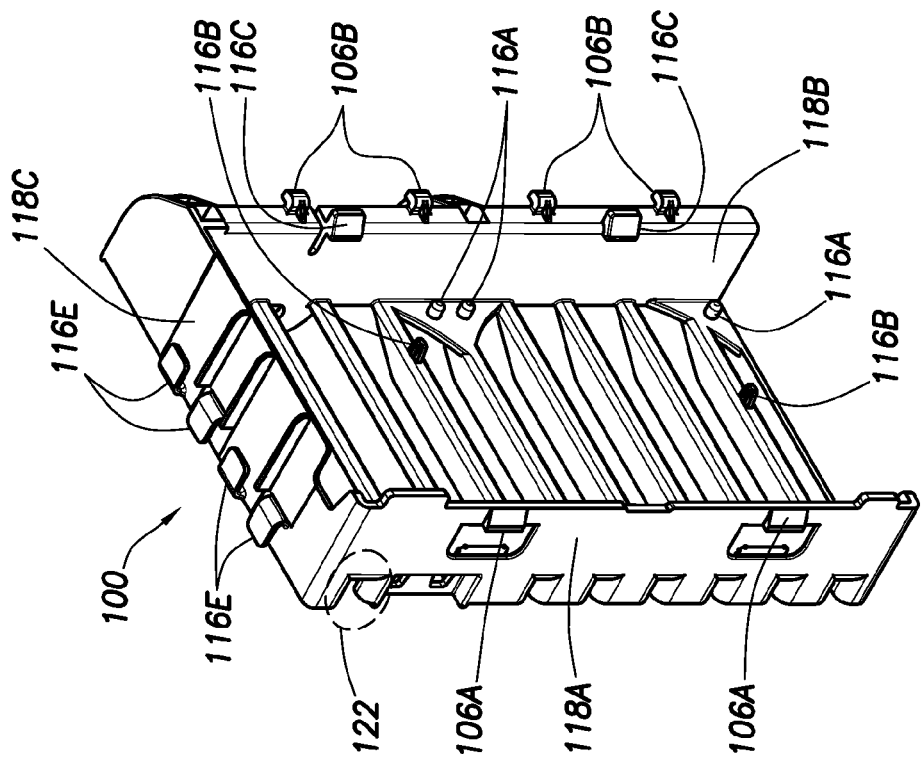
Figure 1A:
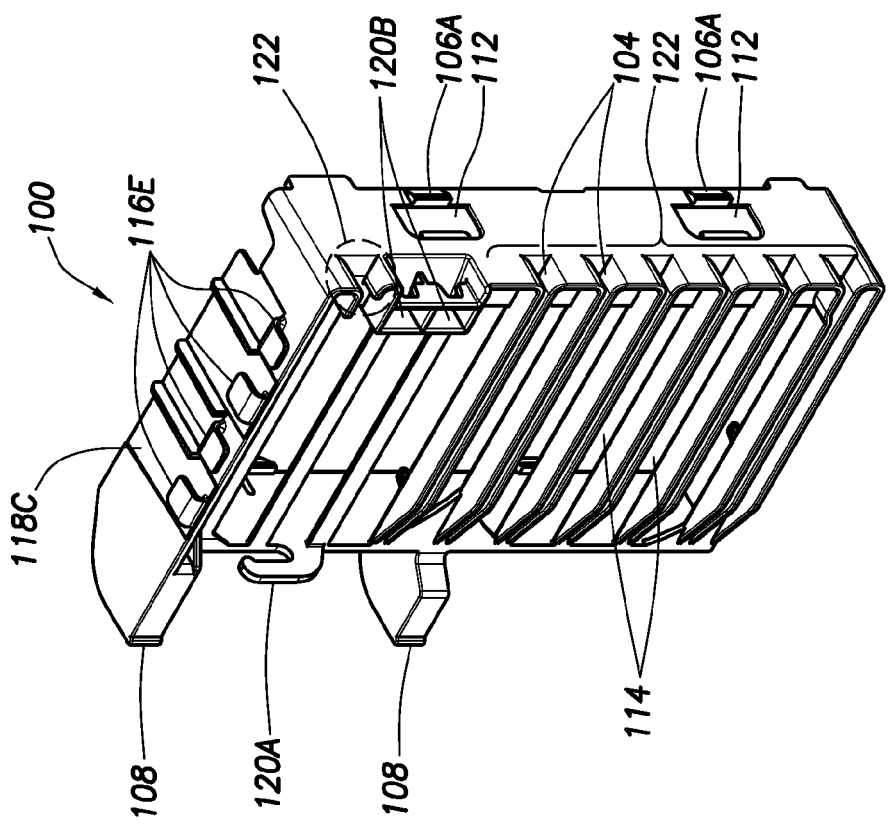

FIGS. 1A-1D show various perspective views of a multi-functional expansion card guide 100 in accordance with an embodiment of the disclosure. FIG. 1A shows an upper front perspective view of the expansion card guide 100. FIG. 1B shows an upper back perspective view of the expansion card guide 100. FIG. 1C shows a lower front perspective view of the expansion card guide 100. FIG. 1D shows a lower back perspective of the expansion card guide 100.

As shown in FIGS. 1A-1D, the expansion card guide 100 comprises a frame having multiple sides, including a card guide surface 122 with guide lanes 104. The guide lanes 104 may either protrude from the card guide surface 122 or are formed therein as guide indentations. As shown, the guide lanes 104 extend across the card guide surface 122. Each guide lane 104 is configured to facilitate installation of an expansion card by guiding the expansion card along a suitable path that will result in connection of the expansion card to a corresponding connector (e.g., on a motherboard). In at least some embodiments, the card guide surface 122 comprises vents 114 that enable air to pass through the card guide surface 122.

As shown in FIGS. 1A-1D, the expansion card guide 100 also comprises a plurality of chassis attachment features 106A and 106B for tool-less attachment of the expansion card guide 100 to a chassis of a computer system. In at least some embodiments, the chassis attachment features 106A comprises snap connectors (e.g., wedge shapes along a side of the expansion card guide 100) that are able to interface with a corresponding edge of a chassis surface. By pushing on a designated push space 112, each chassis attachment feature 106A may be released. Meanwhile, the chassis attachment features 106B comprise hooks (L-shaped protrusions) that extend outwardly from a side the expansion card guide 100 and that fit into corresponding slots in a chassis surface.

More specifically, the expansion card guide 100 comprises a first side surface 118A and a second side surface 118B extending from opposite sides of the card guide surface 122. The side surfaces 118A and 118B are shown be at right angles (approximately 90 degrees) from the card guide surface 122 such that the expansion card guide 100 forms a substantially rectangular shape with various attachment features, card guide features, cable management features, etc. As shown, the chassis attachment features 106A (e.g., snap connectors) are along the first side surface 118A and the chassis attachment features 106B (e.g., hooks) are along the second side surface 118B.

Figure 2A:
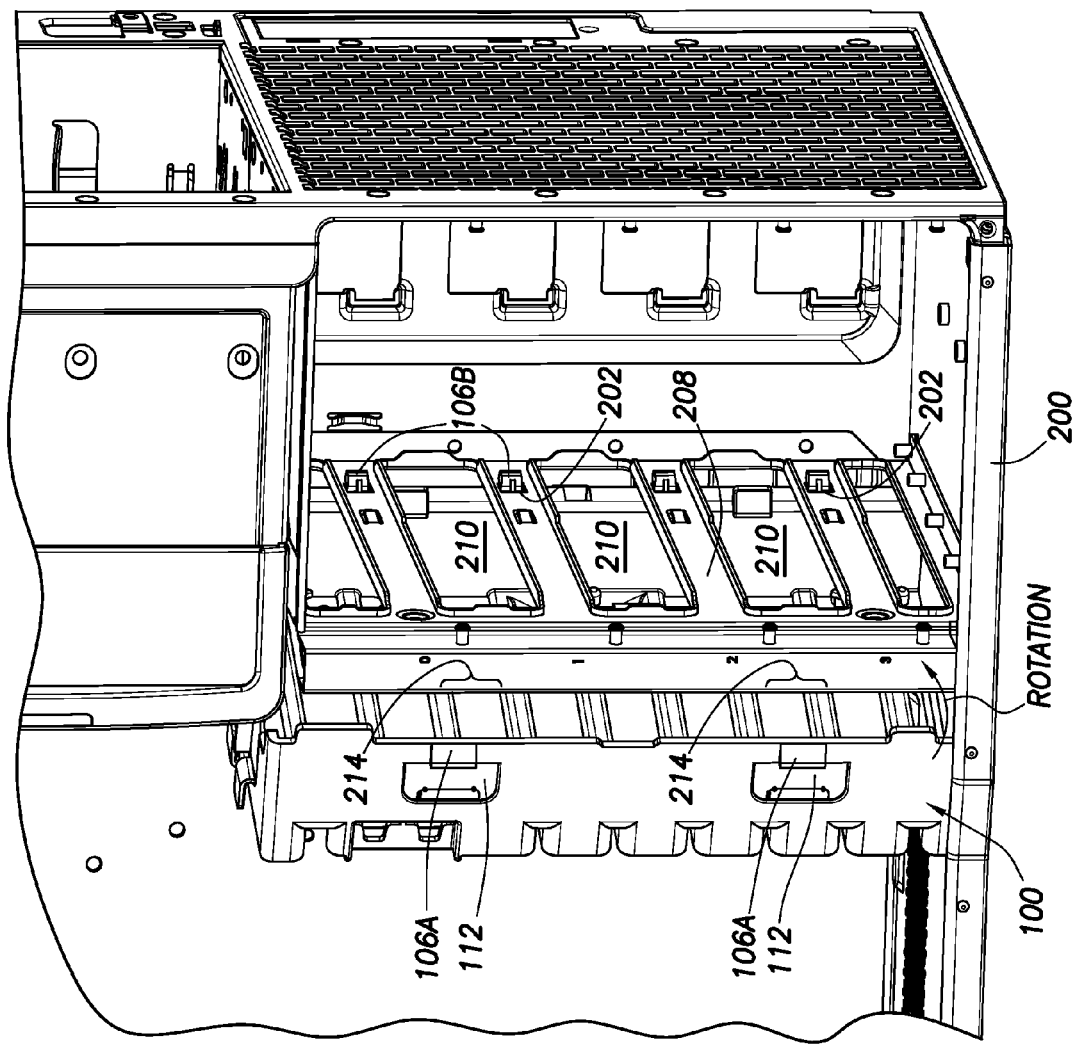

FIGS. 2A-2B show attachment of the expansion card guide 100 into a computer system chassis 200 in accordance with an embodiment of the disclosure. As illustrated in FIG. 2A, the attachment process of the expansion card guide 100 to the chassis 200 involves insertion of the chassis attachment features 106B (e.g., hooks) into corresponding openings (slots) 202 of an interior chassis wall 208. In at least some embodiments, the interior chassis wall 208 is a metallic surface that is fixed to a bottom and/or side of the chassis 200. Also, the interior chassis wall 208 may comprise vents 210 as shown in FIG. 2A to allow for airflow. Once the chassis attachment features 106B are inserted into the slots 202 of the interior chassis wall 208, the attachment process is completed by rotating the expansion card guide 100 toward the interior chassis wall 208 until the chassis attachment features 106A (e.g., snap connectors) are in contact with the interior chassis wall 208 or an extension thereof. Specifically, the contact points 214 of the interior chassis wall 208 are in contact with the chassis attachment features 106A. As shown in FIG. 2B, the chassis attachment features 106A are no longer visible once installation is complete. However, the push spaces 112 are visible and may be pushed to release the expansion card guide 110 from the chassis 200. As shown in FIG. 3, once the expansion card guide 100 is attached to the chassis 200, the guide lanes 104 can be used for installation of expansion cards 302.

The embodiments of FIGS. 1A-1D, 2A-2B and 3 are not intended to limit chassis attachment features of an expansion card guide to a particular embodiment. In other words, the chassis attachment features 106A and 106B may alternatively comprise other sets of protrusions, indentations, and/or holes on any surface of the expansion card guide 100 to interface with corresponding contact points in a chassis frame. Further, the shape of the expansion card guide 100 may vary. For example, the side surfaces 118A and 118B may be formed at different angles (other than 90 degrees) or may be rounded compared to the embodiment of FIGS. 1A-1D. In general, expansion card guides such as the expansion card guide 100 may comprise a set of chassis attachment features that enable tool-less attachment of the expansion card guide to a corresponding surface (or surfaces) of a chassis frame. Such chassis attachment features also may enable tool-less detachment of an expansion card guide from a corresponding surface (or surfaces) of a chassis frame.

The expansion card guide 100 of FIGS. 1A-1D also comprises a set of cable management features 120A and 120B for tool-less management of auxiliary expansion card cables. Examples of auxiliary expansion card cables include power cables that may or may not be used even after an expansion card has been installed. In at least some embodiments, the cable management feature 120A comprises a cable routing member configured to hold auxiliary expansion card cables in a desired position (e.g., out of an expansion card installation zone). As an example, the cable management feature 120A of FIGS. 1A-1D comprises a hook shape that extends outwardly from the card guide surface 122. Meanwhile, the cable management feature 120B comprises a set of dummy plug receptacles (i.e., there is no electrical connection) formed in the card guide surface 122. The cable management feature 120B is configured to hold auxiliary expansion card cable plugs in a desired position when not is use or at least until expansion card installation is complete.

Figure 6A:
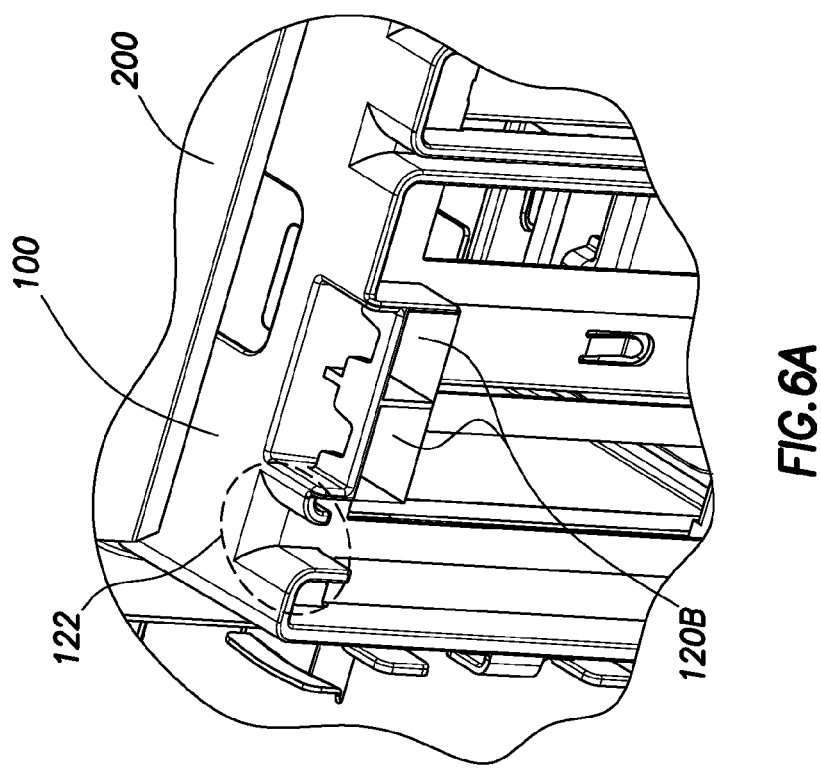
FIGS. 6A-6B show cable management features of the multi-functional expansion card guide in accordance with an embodiment of the disclosure.
Figure 6B:
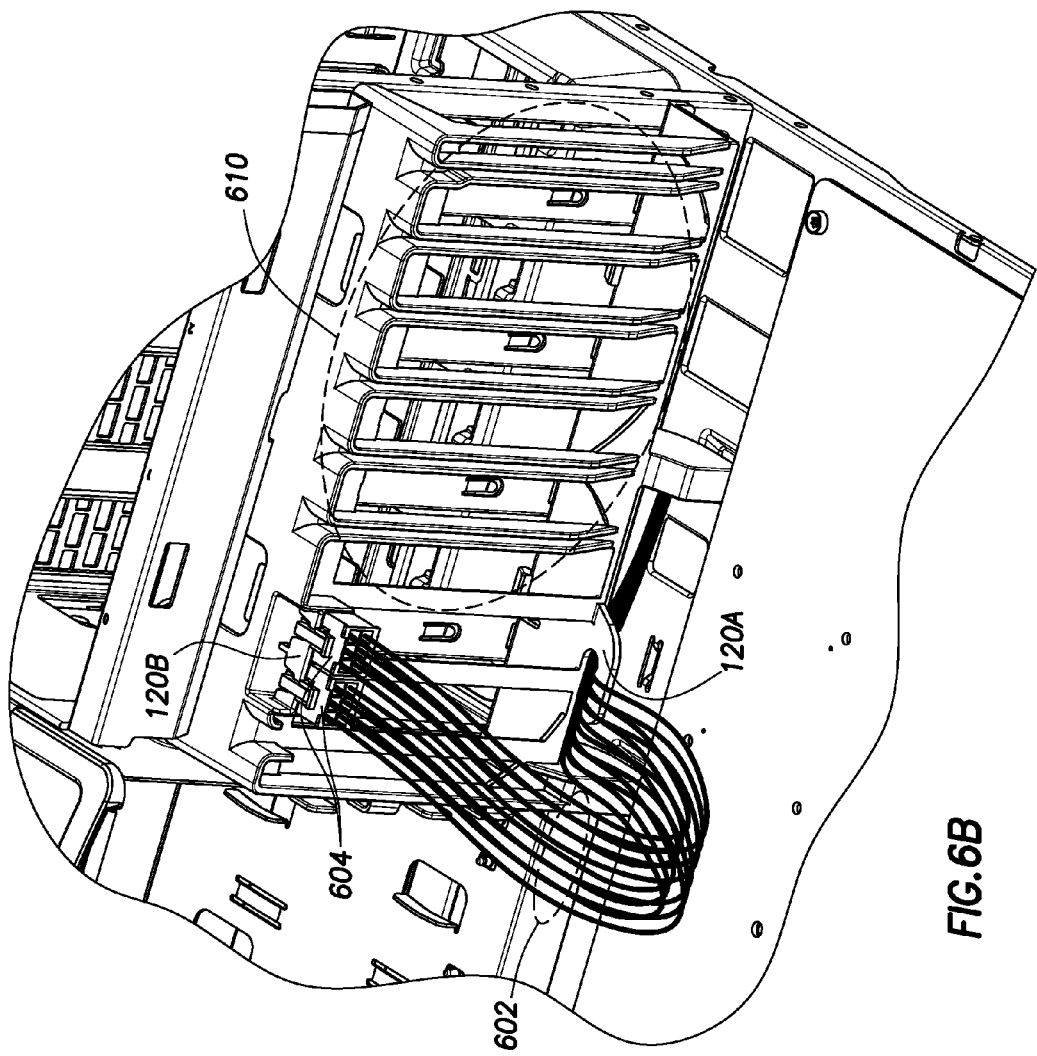

FIGS. 6A-6B show the cable management features 120A and 120B of the expansion card guide 100 in accordance with an embodiment of the disclosure. In FIG. 6A, a close-up view of the cable management feature 120B is shown. As shown, the cable management feature 120B comprises two side-by-side dummy plug receptacles shaped to receive two auxiliary expansion card cable plugs. In FIG. 6B, auxiliary expansion card cables 602 are shown in relation to the cable management features 120A and 120B. Specifically, the cable management feature 120A directs the auxiliary expansion card cables 602 away from an expansion card installation zone 610 and the cable management feature 120B holds auxiliary expansion card cable plugs 604 in a set position. As needed, each auxiliary expansion card cable plug 604 may be removed from the cable management feature 120B and plugged into an installed expansion card to provide, for example, additional power.

The embodiments of FIGS. 1A-1D and 6A-6B are not intended to limit cable management features of a multi-functional expansion card guide to a particular embodiment. In other words, the cable management features 120A and 120B may alternatively comprise other sets of protrusions, indentations, and/or holes on any surface of the expansion card guide 100 configured to retain auxiliary expansion card cables out of an expansion card installation zone or to otherwise hold auxiliary expansion card cables using the expansion card guide 100. In general, expansion card guides such as the expansion card guide 100 may comprise a set of cable management features that enable tool-less management of auxiliary expansion card cables within a chassis.

The expansion card guide 100 of FIGS. 1A-1D also comprises at least one motherboard contact extension 108. The example of FIGS. 1A-1D shows two motherboard contact extensions 108 that extend outwardly from the second side surface 118B in two directions, including extending past the guide lanes 104 on the card guide surface 122. The quantity and sizing of such motherboard contact extensions 108 may vary in different embodiments.

Figure 5:
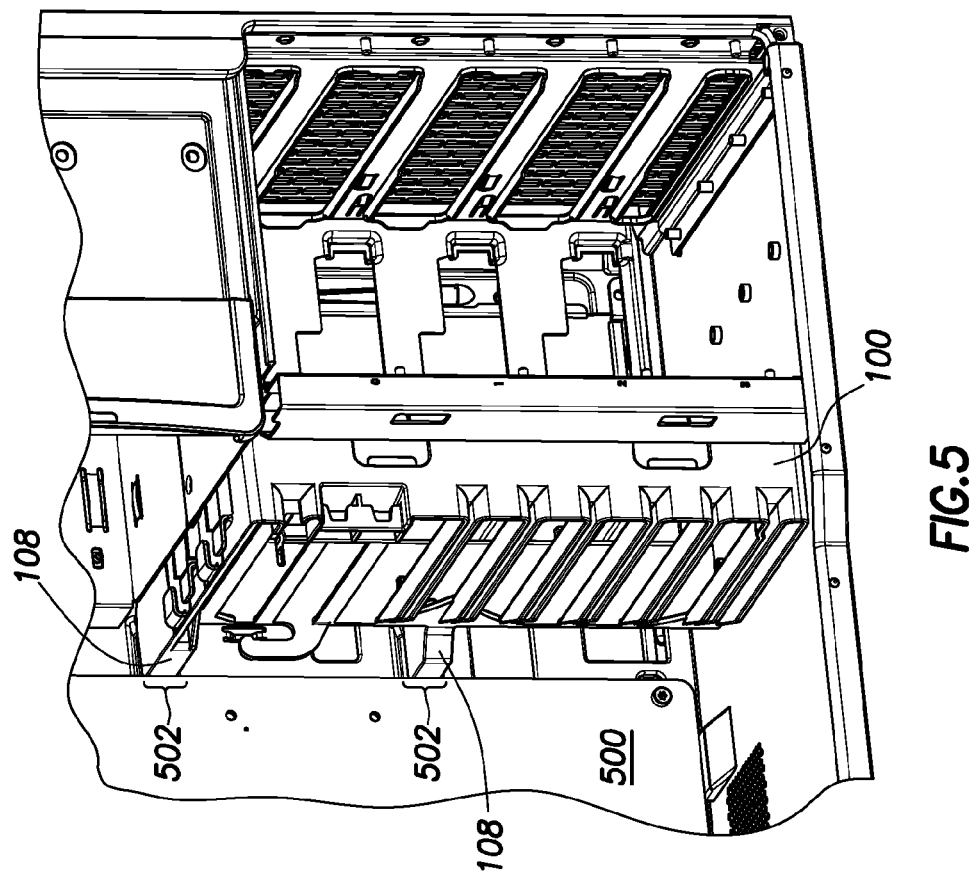
FIG. 5 shows retention of a motherboard by the multi-functional expansion card guide in accordance with an embodiment of the disclosure.

In operation, the motherboard contact extensions 108 are able to retain a motherboard at a fixed position within a computer chassis without use of tools. FIG. 5 shows retention of a motherboard 500 by the expansion card guide 100 in accordance with an embodiment of the disclosure. As shown, the motherboard contact extensions 108 of the expansion card guide 100 contact the motherboard 500 at contact points 502. In at least some embodiments, tool-less removal of the expansion card guide 100 enables the motherboard 500 to be subsequently removed (e.g., by pushing the motherboard 500 through the space previously occupied by the expansion card guide 100).

The expansion card guide 100 of FIGS. 1A-1D also comprises a set of fan mount features 116A-116E. The fan mount features 116A, 116B, and 116D are located on a back side of the card guide surface 122 (i.e., the side opposite to where expansion cards are installed). Meanwhile, the fan mount feature 116C is located on the second side surface 118B and the fan mount feature 116E is located along a third side surface 118C that extends from the card guide surface 122 perpendicular to the first side surface 118A and the second side surface 118B. As shown, the third side surface 118C comprises cable routing features for at least one fan.

In at least some embodiments, the fan mount feature 116A comprises a plurality of rounded (e.g., cylindrical) pin protrusions that can be aligned with corresponding indentations or holes in a fan frame to hold at least one fan in place. Meanwhile, the fan mount feature 116B comprises plurality of flat-edged pin protrusions that ensure fans are installed in the correct orientation. If a fan is installed in the wrong direction, the fan blades will hit a fan mount feature 116B and will not rotate. In this manner, detection of incorrect fan installation is possible. Meanwhile, the fan mount feature 116D (see FIG. 1D) comprises a plurality of hook protrusions that extend outwardly from the back side of the card guide surface 122. In operation, the fan mount feature 116D holds at least one side edge of a fan frame against the back side of the card guide surface 122 to hold at least one fan in place. Meanwhile, the fan mount feature 116C comprises a plurality of wedge shapes that extend from the second side surface 118B. In operation, the fan mount feature 116C retains the edge of at least one fan. Meanwhile, the fan mount feature 116E comprises a series of hooks for routing fan cables. In accordance with at least some embodiments, a fan can be attached to and detached from the expansion card guide 100 without tools.

Figure 4B:
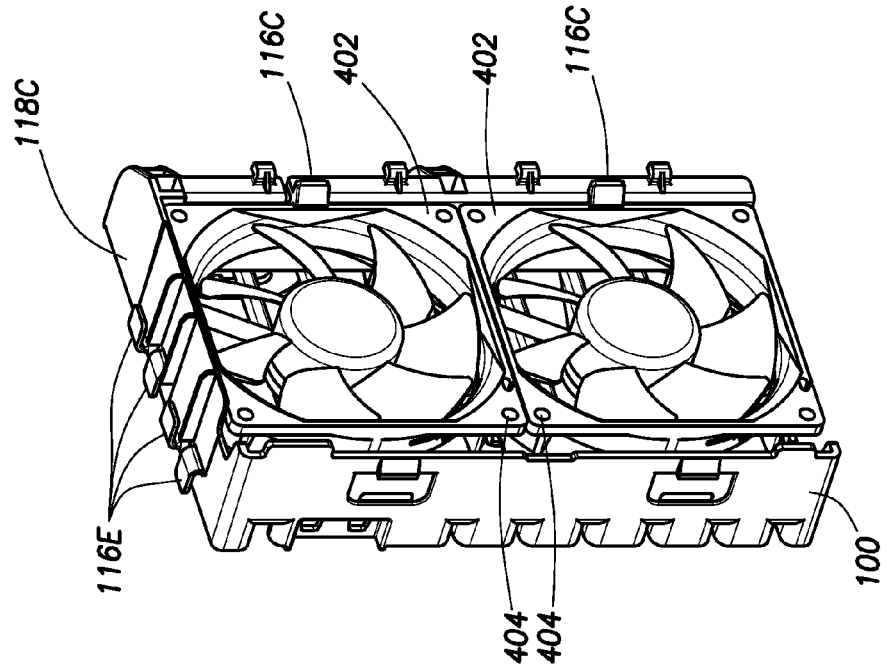
FIGS. 4A-4B show attachment of cooling fans to the multi-functional expansion card guide in accordance with an embodiment of the disclosure.
Figure 4A:
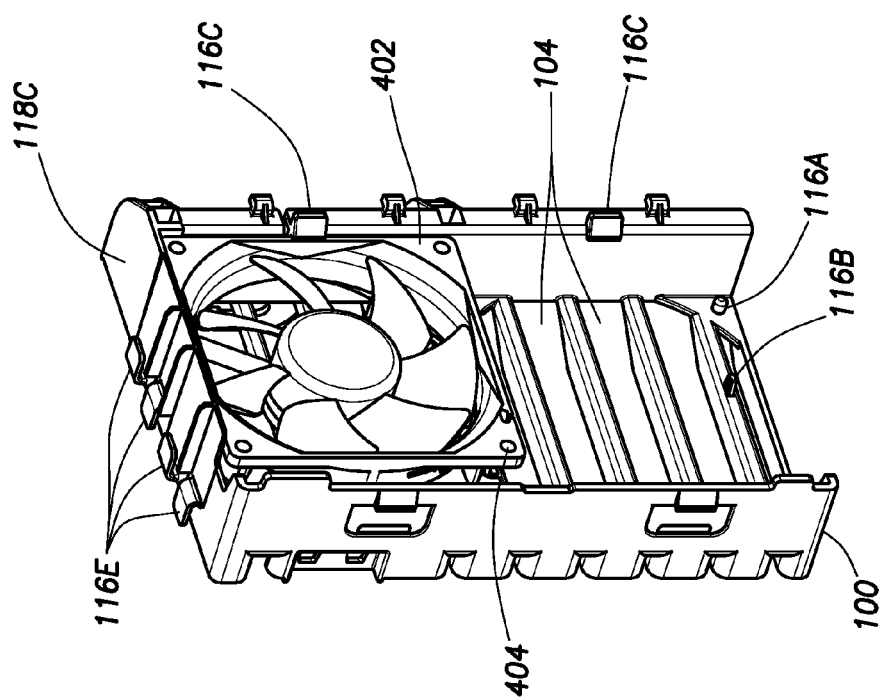

FIGS. 4A-4B show attachment of cooling fans to the expansion card guide 100 in accordance with an embodiment of the disclosure. In FIG. 4A, a single cooling fan 402 is attached to the expansion card guide 100 using a sub-set of the fan mount features 116A-116D. In FIG. 4B, a pair of cooling fans 402 are attached to the expansion card guide 100 using the fan mount features 116A-116D. Although not specifically shown in FIGS. 4A-4B, the fan mount feature 116E may be used to route fan cables.

The embodiments of FIGS. 1A-1D and FIGS. 4A-4B are not intended to limit fan mounts of an expansion card guide to a particular embodiment. In other words, the fan mount features 116A-116E may alternatively comprise a set of protrusions, indentations, and/or holes on any surface of the expansion card guide 100 configured to hold a fan in a desired position and/or to route fan cables. In at least some embodiments, fan mount features such as those shown in FIGS. 1A-1E, or others, enable tool-less mounting of cooling fans to the expansion card guide 100. In general, expansion card guides such as the expansion card guide 100 may comprise a set of fan mount features that enable tool-less attachment of cooling fans to the expansion card guide. Such fan mounts features also may enable tool-less detachment of cooling fans from an expansion card guide.

Figure 7A:
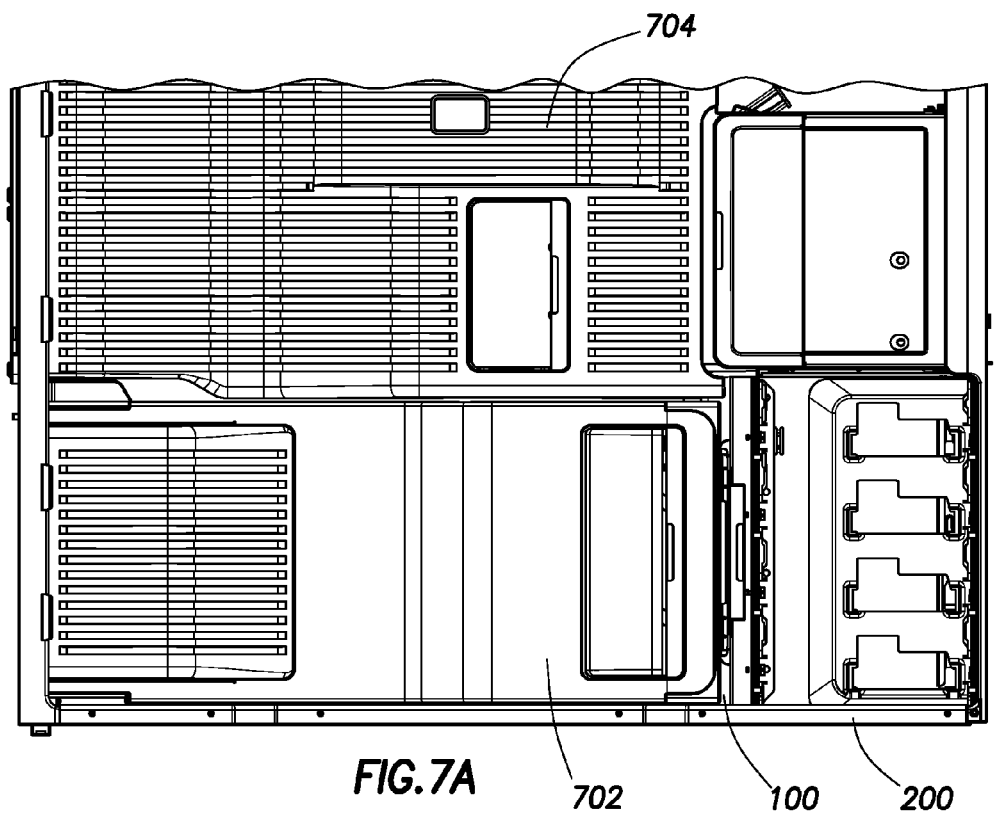
FIGS. 7A-7B show an expansion card area cover and an airflow guide attached to the multi-functional expansion card guide in accordance with an embodiment of the disclosure.
Figure 7B:
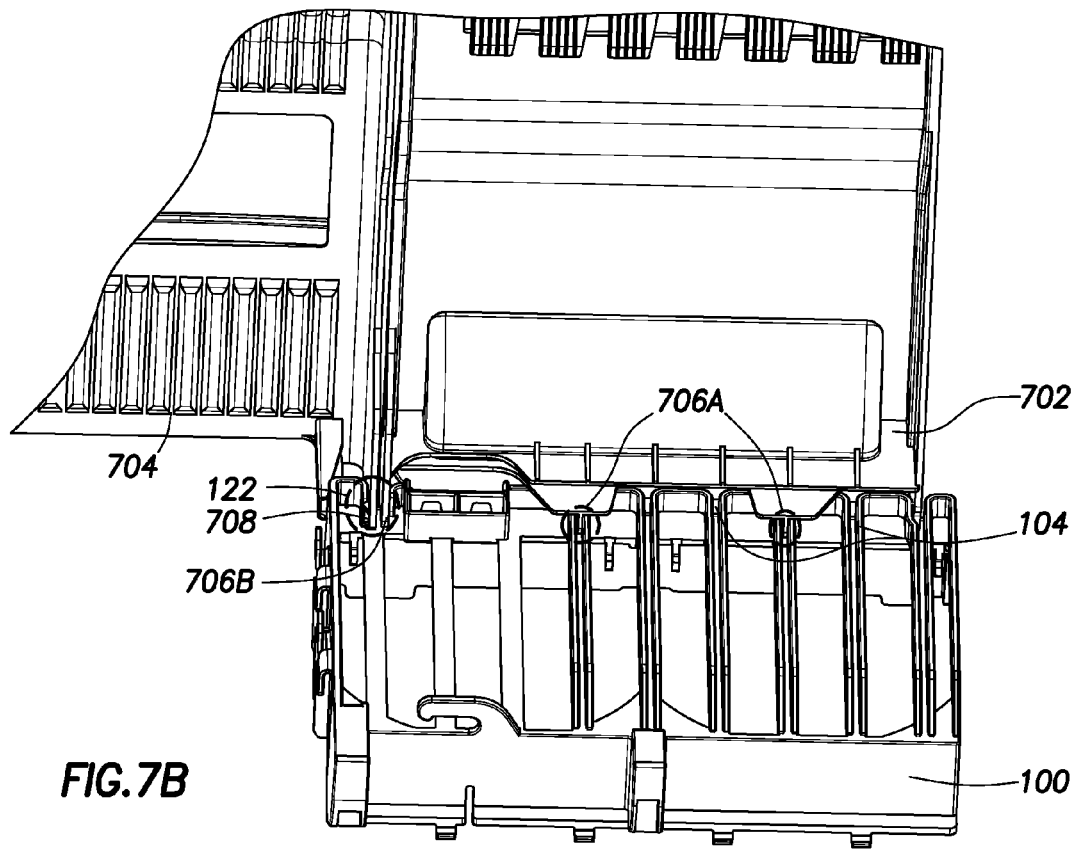

FIGS. 7A-7B show an expansion card area cover 702 and an airflow guide 704 attached to the expansion card guide 100 in accordance with an embodiment of the disclosure. In FIG. 7A, the expansion card area cover 702 and the airflow guide 704 are installed, in part, by attachment to the expansion card guide 100. In FIG. 7B, a perspective view of the expansion card area cover 702 and the airflow guide 704 attached to the expansion card guide 100 as in FIG. 7A is provided. As shown in FIG. 7B, the expansion card area cover 702 comprises attachment extensions 706A that fit into corresponding guide lanes 104 of the expansion card guide 100. The expansion card area cover 702 also comprises an attachment extension 706B that shares an attachment guide gap 122 of the expansion card guide 100 with an attachment extension 708 of the airflow guide 704.

The embodiment of FIGS. 1A-1D and 7A-7B is not intended to limit the attachment of an expansion card area cover and/or an airflow guide to an expansion card guide to a particular embodiment. In other words, the expansion card guide 100 may alternatively comprise a set of protrusions, indentations, and/or holes on any surface of the expansion card guide 100 configured to hold an expansion card area cover and/or an airflow guide in a desired position. In general, multi-functional expansion card guides such as the expansion card guide 100 may comprise a set of attachment features to enable tool-less attachment of an expansion card area cover and/or an airflow guide to the expansion card guide.

Figure 8:
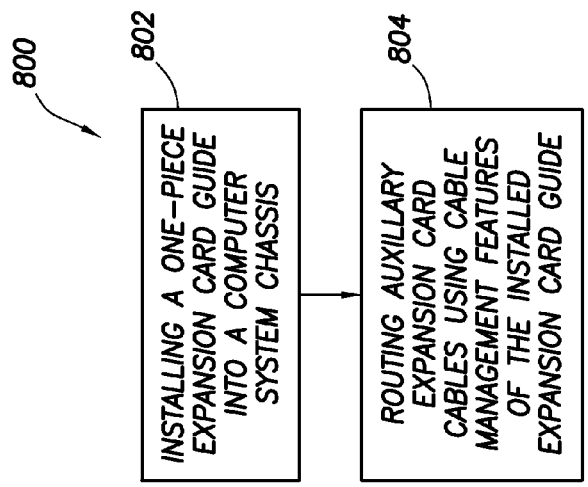
FIG. 8 shows a method in accordance with an embodiment of the disclosure.

FIG. 8 shows a method 800 in accordance with an embodiment of the disclosure. As shown, the method 800 comprises installing a one-piece expansion card guide into a computer system chassis without tools (block 802). In at least some embodiments, installing the expansion card guide comprises aligning a set of chassis attachment features of the expansion card guide with corresponding attachment points of the computer system chassis. At block 804, the method 800 comprises routing auxiliary expansion card cables using cable management features of the attached expansion card guide. As an example, in some embodiments, routing auxiliary expansion card cables using cable management features of the attached expansion card guide comprises inserting an auxiliary expansion card cable plug into a plug receptacle of the expansion card guide and retaining auxiliary expansion card cables in a fixed position with a cable routing member of the expansion card guide.

In accordance with at least some embodiments, the method 800 additional steps. For example, in some embodiments, the method additionally comprises mounting at least one cooling fan to a back side of the expansion card guide without tools by aligning each fan frame with fan mounts of the expansion card guide. Additionally or alternatively, the method 800 may comprise retaining a motherboard in the computer system chassis at a fixed position by aligning a motherboard contact extension of the expansion card guide with corresponding contact points of the motherboard. Additionally or alternatively, the method 800 may comprise installing an expansion card area cover into the computer system by aligning an attachment extension of the expansion card area cover with a corresponding attachment feature of the expansion card guide. Additionally or alternatively, the method 800 may comprise installing an airflow guide into the computer system by aligning an attachment extension of the airflow guide with a corresponding attachment feature of the expansion card guide.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An expansion card guide for a computer system, comprising:
    a frame haying a card guide surface for receiving expansion cards;
    a plurality of chassis attachment features provided on at least one side of said frame for tool-less attachment of the expansion card guide to a chassis of the computer system; and
    a plurality of cable management features provided on at least one side of said frame for tool-less management of auxiliary expansion card cables,
        wherein the plurality of cable management features comprises a dummy plug receptacle for retaining auxiliary expansion card cable plugs and a cable routine member for retaining auxiliary expansion card cables.

2. The expansion card guide of claim 1 wherein the frame further comprises first and second side surfaces that extend from opposite sides of the card guide surface, wherein said plurality of chassis attachment features are located on said first and second angled surfaces.

3. The expansion card guide of claim 2 wherein the frame further comprises a third side surface that extends from the card guide surface perpendicular to the first and second side surfaces, wherein said third side surface comprises cable routing features for at least one fan.

4. The expansion card guide of claim 1 wherein the card guide surface comprises vents.

5. The expansion card guide of claim 1 wherein the frame further comprises fan mount features located on a back side of the card guide surface.

6. The expansion card guide of claim 1 wherein the frame further comprises at least one motherboard contact extension to retain a motherboard at a fixed position within the chassis.

7. The expansion card guide of claim 1 wherein the frame further comprises at least one airflow guide attachment feature.

8. The expansion card guide of claim 1 wherein frame further comprises at least one expansion card area cover attachment feature.

9. The expansion card guide of claim 1 wherein the expansion card guide is a single piece of molded plastic.

10. A method, comprising:
   installing a one-piece expansion card guide into a computer system chassis without tools; and
   routing auxiliary expansion card cables using cable management features of the installed expansion card guide,
      wherein routing auxiliary expansion card cables using cable management features of the attached expansion card guide comprises inserting an auxiliary expansion card cable plug into a dummy plug receptacle of the expansion card guide and retaining auxiliary expansion card cables in a fixed position with a cable routing member of the expansion card guide.

11. The method of claim 10 wherein installing the expansion card guide comprises aligning a plurality of chassis attachment features of the expansion card guide with corresponding attachment points of the computer system chassis.

12. The method of claim 10 further comprising mounting at least one cooling fan to a back side of the expansion card guide without tools by aligning each fan frame with fan mount features of the expansion card guide.

13. The method of claim 10 further comprising retaining a motherboard in the computer system chassis at a fixed position by aligning a motherboard contact extension of the expansion card guide with corresponding contact points of the motherboard.

14. The method of claim 10 further comprising installing an expansion card area cover into the computer system by aligning an attachment extension of the expansion card area cover with an corresponding attachment feature of the expansion card guide.

15. The method of claim 10 further comprising installing an airflow guide into the computer system by aligning an attachment extension of the airflow guide with a corresponding attachment feature of the expansion card guide.

16. An expansion card guide for a computer system, comprising:
   means for attachment to a chassis of the computer system without tools; and
   means for managing auxiliary expansion card cables without tools,
      wherein the means for managing the auxiliary expansion card cables without tools comprises means for retaining auxiliary expansion card cable plugs and means for retaining auxiliary expansion card cables.

17. The expansion card guide of claim 16 further comprising means for mounting at least one cooling fan to a back side of the expansion card guide without tools.

18. The expansion card guide of claim 16 further comprising:
   means for securing a motherboard within the computer system;
   means for securing an expansion card area cover within the computer system; and
   means for securing an airflow guide within the computer system.

19. The expansion card guide of claim 16 further comprising means to vent for air flow.

20. The expansion card guide of claim 16 wherein the expansion card guide is a single piece of molded plastic.

* * * * *

UNITED STATES PATENT AND TRADEMARK OFFICE
CERTIFICATE OF CORRECTION

PATENT NO. : 8,243,460 B2
APPLICATION NO. : 12/549894
DATED : August 14, 2012
INVENTOR(S) : Tom J. Searby Page 1 of 1

It is certified that error appears in the above-identified patent and that said Letters Patent is hereby corrected as shown below:

In column 6, line 34, in Claim 1, delete "haying" and insert -- having --, therefor.

In column 7, line 1, in Claim 8, after "wherein" insert -- the --.

Signed and Sealed this
Twenty-sixth Day of February, 2013

Teresa Stanek Rea
*Acting Director of the United States Patent and Trademark Office*